US010264499B2

(12) United States Patent
Kovács et al.

(10) Patent No.: US 10,264,499 B2
(45) Date of Patent: Apr. 16, 2019

(54) NETWORK NODE, AND METHOD FOR HANDLING A REQUEST FOR AN APPLICATION TO ACCESS A WIRELESS LOCAL AREA NETWORK

(71) Applicant: Telefonaktiebolaget LM Ericsson (publ), Stockholm (SE)

(72) Inventors: Àkos Kovács, Stockholm (SE); Ferenc Kubinszky, Linköping (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 2 days.

(21) Appl. No.: 15/112,908

(22) PCT Filed: Jan. 27, 2014

(86) PCT No.: PCT/SE2014/050091
§ 371 (c)(1),
(2) Date: Jul. 20, 2016

(87) PCT Pub. No.: WO2015/112067
PCT Pub. Date: Jul. 30, 2015

(65) Prior Publication Data
US 2016/0337921 A1    Nov. 17, 2016

(51) Int. Cl.
*H04W 36/14* (2009.01)
*H04W 36/26* (2009.01)
(Continued)

(52) U.S. Cl.
CPC ........... *H04W 36/14* (2013.01); *H04W 24/08* (2013.01); *H04W 36/22* (2013.01); *H04W 36/26* (2013.01);
(Continued)

(58) Field of Classification Search
CPC ..... H04W 84/12; H04W 88/06; H04W 36/14; H04W 88/08; H04W 84/042;
(Continued)

(56) References Cited

U.S. PATENT DOCUMENTS 7,756,082 B1 * 7/2010 Dhamdhere ...... H04W 36/0083
370/331
2001/0012301 A1 * 8/2001 Yi ........................... H04L 47/14
370/439
(Continued)

FOREIGN PATENT DOCUMENTS

| EP | 2355581 A1 | 8/2011 |
| WO | 2010100315 A1 | 9/2010 |
| WO | 2012033774 A2 | 3/2012 |

OTHER PUBLICATIONS

Supplementary European Search Report in corresponding European Application No. 14879486, dated Sep. 27, 2016, 4 pages.
(Continued)

*Primary Examiner* — Rownak Islam
(74) *Attorney, Agent, or Firm* — Rothwell, Figg, Ernst & Manbeck, p.c.

(57) ABSTRACT

A method in a network node (103, 104, 111) for handling a request for an application to access a Wireless Local Area Network, WLAN (101), which application is run by a wireless device (114) and which application communicates in a cellular communications network (100). The network node (103, 104, 111) obtains traffic pattern information relating to the application, which traffic pattern information is derived from a deep packet inspection functionality of the cellular communications network (100). The network node (103, 104, 111) also obtains a decision whether to admit or refuse the request for the application to access the WLAN (101), which decision is based on the obtained traffic pattern information.

20 Claims, 5 Drawing Sheets

(51) Int. Cl.
    *H04W 24/08* (2009.01)
    *H04W 36/22* (2009.01)
    *H04W 36/30* (2009.01)
    H04W 84/04 (2009.01)
    H04W 84/12 (2009.01)
    H04W 88/08 (2009.01)

(52) U.S. Cl.
    CPC .......... *H04W 36/30* (2013.01); *H04W 84/042* (2013.01); *H04W 84/12* (2013.01); *H04W 88/08* (2013.01)

(58) Field of Classification Search
    CPC ..... H04W 24/08; H04W 36/22; H04W 36/26; H04W 36/30; H04W 36/36
    USPC .................................................. 370/331, 332
    See application file for complete search history.

(56) References Cited

U.S. PATENT DOCUMENTS

| | | | |
|---|---|---|---|
| 2004/0133806 A1* | 7/2004 | Joong | H04L 63/08 |
| | | | 726/5 |
| 2007/0008929 A1 | 1/2007 | Lee et al. | |
| 2007/0217377 A1* | 9/2007 | Takeuchi | H04W 48/20 |
| | | | 370/338 |
| 2008/0085712 A1 | 4/2008 | Han | |
| 2008/0146240 A1 | 6/2008 | Trudeau | |
| 2008/0310324 A1* | 12/2008 | Chaponniere | H04L 47/10 |
| | | | 370/254 |
| 2010/0020681 A1* | 1/2010 | Nakashima | H04L 12/4625 |
| | | | 370/229 |
| 2012/0221955 A1 | 8/2012 | Raleigh et al. | |
| 2012/0324100 A1 | 12/2012 | Tomici et al. | |
| 2013/0039337 A1* | 2/2013 | Hwang | H04W 36/0066 |
| | | | 370/331 |
| 2013/0136105 A1* | 5/2013 | Lohtia | H04W 36/14 |
| | | | 370/331 |
| 2013/0242783 A1* | 9/2013 | Horn | H04W 24/10 |
| | | | 370/252 |
| 2013/0258887 A1* | 10/2013 | De Pasquale | H04W 72/085 |
| | | | 370/252 |
| 2013/0326631 A1 | 12/2013 | Cartmell et al. | |
| 2013/0347059 A1* | 12/2013 | Fong | H04L 63/10 |
| | | | 726/1 |

OTHER PUBLICATIONS

Vetrivelan, P., et al., "SMIRT with Call Admission Control (CAC) Based Vertical Handover Decision for Seamless Mobility in Multi-Access 4G Heterogeneous Wireless Overlay Networks", Proceedings of the International MultiConference of Engineers and Computer Scientists 2012, vol. I, IMECS 2012, Mar. 14-16, 2012, Hong Kong, 6 pages.
International Search Report and Written Opinion dated Sep. 30, 2014 in International application No. PCT/SE2014/050091, 9 pages.
European Office Action dated Jul. 28, 2017, in European Application No. 14 879 486.0, 6 pages.
European Patent Office communication issued in EP 14 879 486.0 dated Mar. 19, 2018, 6 pages.

* cited by examiner

NETWORK NODE, AND METHOD FOR HANDLING A REQUEST FOR AN APPLICATION TO ACCESS A WIRELESS LOCAL AREA NETWORK

CROSS-REFERENCE TO RELATED APPLICATION(S)

This application is a 35 U.S.C. § 371 National Phase Entry Application from PCT/SE2014/050091, filed Jan. 27, 2014, and designating the United States.

TECHNICAL FIELD

Embodiments herein relate to a network node, and to a method in the network node. In particular they relate to handling a request for an application to access a Wireless Local Area Network, WLAN.

BACKGROUND

Communication devices such as wireless devices are also known as e.g. user equipments (UE), mobile terminals, wireless terminals, and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, tablet computers or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The cellular communications network covers a geographical area which is divided into cell areas, wherein each cell area being served by an network node. A cell is the geographical area where radio coverage is provided by the network node.

The wireless device may also be adapted to communicate via a Wireless Local Area Network (WLAN), sometimes referred to as a Wi-Fi network. The wireless device may connect to a network resource such as the Internet via a wireless network access point or access point of the WLAN.

In scenarios where a WLAN is co-deployed with a cellular communications network, the WLAN may be used to offload the cellular communications network to some extent, especially by passing those users to the WLAN which require high transport and/or radio resource usage due to the nature of their applications running.

With end-user Quality of Experience (QoE) in focus, it is crucial, that a proper and precise decision mechanism is used to make decisions on handovers between the cellular communications network and the WLAN, so that the end-user does not experience performance or throughput degradation after the handover. Accordingly, it is desirable that the QoE is at least on the same level after connecting to the WLAN as it was in the cellular communications network, before the handover. Handovers between networks of different types, such as between a cellular communications network and a WLAN, are often referred to as vertical handovers or vertical handoffs. The decision mechanism is sometimes referred to as a Call Admission Control (CAC) mechanism or a Connection Admission Control (CAC) mechanism.

The characteristics and usage of the WLAN is of great importance when providing a CAC mechanism to be used to make decisions on handovers from a cellular communications network to a WLAN. On a shared wireless channel operating with several modulation schemes, which may be the case in a WLAN, it is the channel occupation time per wireless device or application that matters. In existing solutions, the basis for the decision making mechanism does not provide enough information to enable a proper decision allowing a good capacity usage and performance in the cellular communications network and/or in the WLAN.

SUMMARY

There is a need for an improved decision making mechanism, providing a possibility to make capacity prediction more precise than what is the case with existing solutions, such that a better capacity usage and performance may be enabled in the cellular communications network and/or in the WLAN.

It is therefore an object of embodiments herein to enhance the capacity usage and performance in a WLAN co-deployed with a cellular communications network and/or in a cellular communications network, co-deployed with a WLAN.

According to a first aspect of embodiments herein, the object is achieved by a method in a network node for handling a request for an application to access a Wireless Local Area Network, WLAN. The application is run by a wireless device and communicates in a cellular communications network. When receiving the request for the application to access the WLAN, the network node obtains traffic pattern information relating to the application. The traffic pattern information is derived from a deep packet inspection functionality of the cellular communications network. The network node further obtains a decision whether to admit or refuse the request for the application to access the WLAN, which decision is based on the obtained traffic pattern information.

According to a second aspect of embodiments herein, the object is achieved by a network node for handling a request for an application to access a Wireless Local Area Network, WLAN. The application is run by a wireless device and communicates in a cellular communications network. The network node is configured to obtain traffic pattern information relating to the application, which traffic pattern information is derived from a deep packet inspection functionality of the cellular communications network. The network node is further configured to obtain a decision whether to admit or refuse the request for the application to access the WLAN, which decision is based on the obtained traffic pattern information.

An advantage with embodiments herein is that traffic pattern information derived from a Deep Packet Inspection (DPI), provides a more accurate information about characteristics of the application than what is the case in existing solutions. Thereby, the decision whether to admit or refuse the request for an application to access the WLAN is based on more accurate information than in existing solutions. Thereby, an improved capacity usage and performance of the cellular communications network and of the WLAN, co-deployed with the cellular communications network, may be achieved.

BRIEF DESCRIPTION OF THE DRAWINGS

Examples of embodiments herein are described in more detail with reference to attached drawings in which.

DETAILED DESCRIPTION

Figure 1:
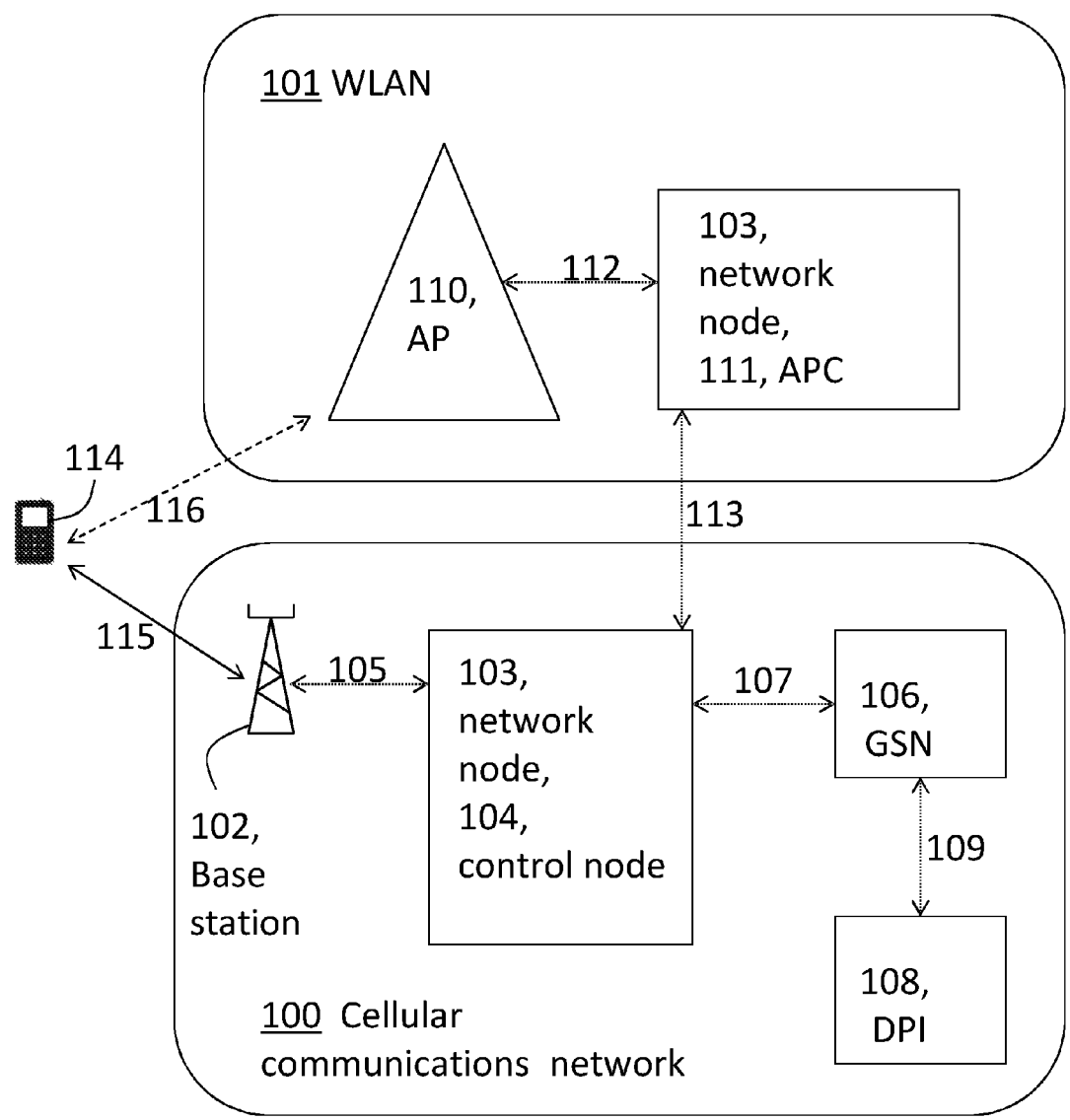
FIG. 1 schematically illustrates embodiments of a cellular communications network and a WLAN.

FIG. 1 depicts an example of a cellular communications network 100 and a WLAN 101, according to a first scenario in which embodiments herein may be implemented.

The cellular communications network 100 may comprise a Radio Access Network (RAN) and a core network.

The cellular communications network 100 may be a Universal Mobile Telecommunications System (UMTS). In that case, the RAN is generally referred to as a UMTS Terrestrial Radio Access Network (UTRAN). Alternatively, the cellular communications network may be a Global System for Mobile Communications (GSM), or another cellular communications network.

The cellular communications network 100 depicted in FIG. 1 comprises a radio access node 102. The radio access node 102 may be a transmission point such as a radio base station, which may e.g. be referred to as a Base Station (BS), a Base Transceiver Station (BTS), a Node B or an evolved node B (eNB), depending of the type of cellular communications network used.

The cellular communications network 100 also comprises one or more network nodes 103. One of the network nodes may be embodied as a control node 104, referred to as the control node 103, 104. The control node 103, 104 is responsible for controlling the radio access node(s) 102 which are connected to it, via a first interface 105 as indicated in FIG. 1. The control node 103, 104 is e.g. adapted to carry out radio resource management and some mobility management functions. The control node 103, 104 may e.g. be a Radio Network Controller (RNC) or a Base Station Controller (BSC). The radio access node node 102 and the control node 103, 104 may be comprised in the RAN.

Furthermore, the cellular communications network comprises a support node 106, such as a General Packet Radio Service (GPRS) Support Node (GSN). The support node may be comprised in the core network of the cellular communications network 100, and may comprise a serving GPRS support node (SGSN) and/or a gateway GPRS support node (GGSN). The control node 103, 104, and the support node 106 may communicate via a second interface 107.

Furthermore, the cellular communications network disclosed in FIG. 1 comprises a Deep Packet Inspection (DPI) node 108. The DPI node 108 may be configured to supply a DPI functionality, as described in more detail below. The support node 106 and the DPI node 108 may communicate via a third interface 109.

The WLAN 101 depicted in FIG. 1 comprises an access point 110, which may also be referred to as an AP, a wireless access point or a hotspot. The access point 110 may act as a central transmitter and receiver of wireless radio signals.

One or several access points 110 may be controlled by a network node 103, which is also comprised in the WLAN. The network node 103 may be embodied as an access point control node 111, referred to as the access point control node 103, 111. The access point control node 103, 111 may also be referred to as a service controller or an access point controller (APC). The access point control node 103, 111 may control one or several access points 110, via a fourth interface 112, and may be arranged to keep track of the utilization of those access points 110.

The access point control node 103, 111 may communicate with the control node 103, 104 of the cellular communications network via fifth interface 113.

A wireless device 114 operates in the cellular communications network. As indicated by the continuous double-arrow in FIG. 1, the wireless device 114 may thus communicate with the radio access node 102 via a sixth interface 115. The wireless may also operate in the WLAN. Then, the wireless device may communicate with the access point 110 via a seventh interface 116. The wireless device 114 may also be referred to as a station (STA). The wireless device 114 may e.g. be a user equipment (UE), a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in a wireless communications network. The term wireless device used in this document also covers other wireless devices such as Machine to machine (M2M) devices.

The wireless device 114 may run one or more applications, sometimes referred to as end-user applications. Each application generates a traffic flow. The characteristics of a traffic flow depends on the nature of the application.

Embodiments herein address scenarios in which at least one application is run by the wireless device 114, which application defines a packet data flow through the cellular communications network 100, via a radio access node 102 serving the wireless device 114.

Embodiments herein are implemented in the network node 103, which e.g. may be embodied as the control node 104 or the access point control node 111, and is referred to as the network node 103, 104, 111.

Example embodiments of a method in a network node 103, 104, 111, for handling a request for an application to access a WLAN 101, will now be described with reference to a flowchart depicted in FIG. 2. The method comprises the following actions, which actions may be taken in any suitable order. Dashed lines of some boxes in FIG. 2 indicate that the corresponding actions are not mandatory. First, the method is described in a general way. The method will then be described in more detail below. Embodiments herein addresses scenarios in which an application is run by the wireless device 114 and communicates in the cellular communications network 100.

Action 201

Figure 2:
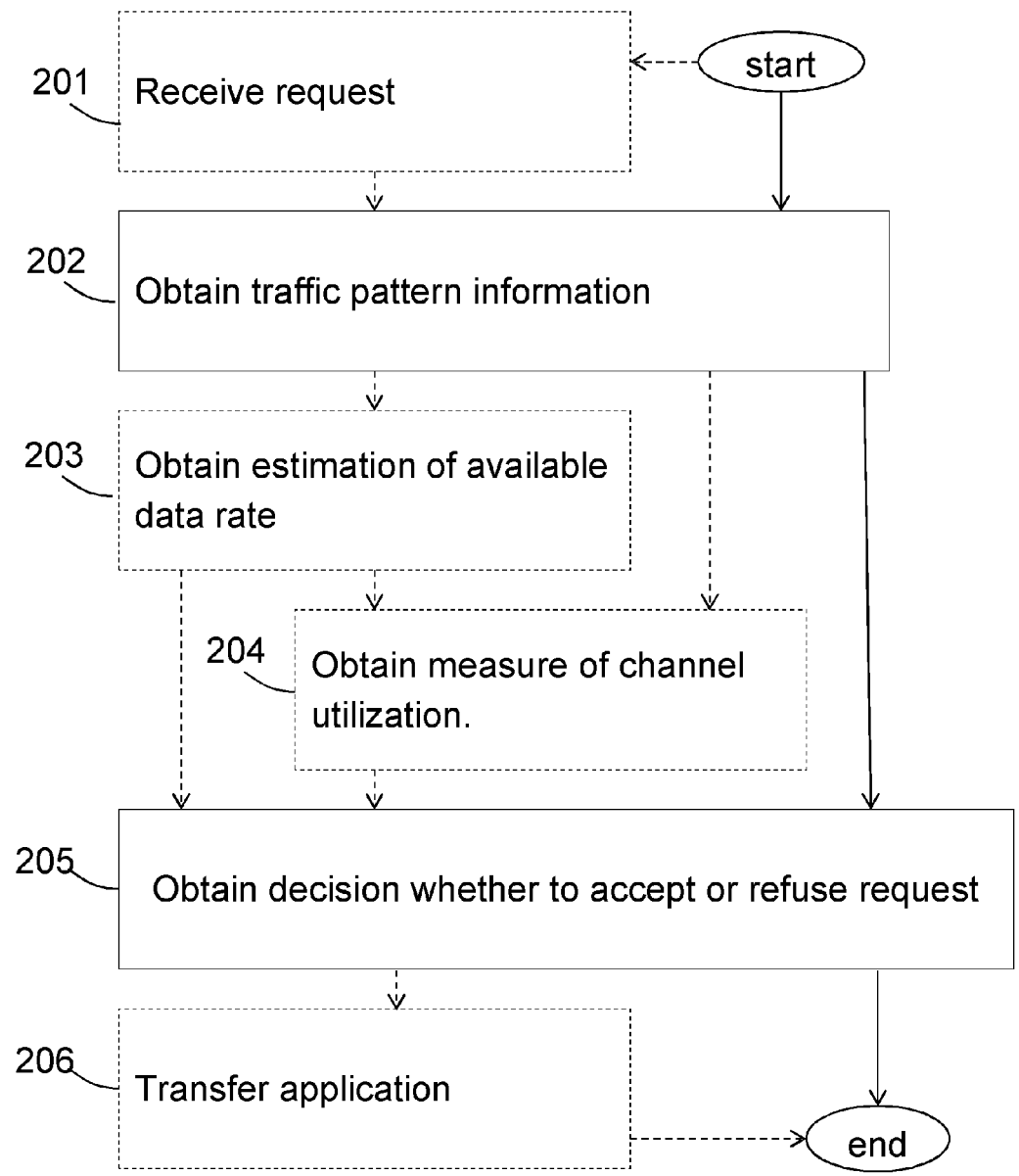
FIG. 2 is a flowchart depicting embodiments of a method in a network node.

The method in the network node 103, 104, 111, for handling a request for an application to access a WLAN 101, may be initiated by receiving the request, as illustrated in FIG. 2.

Action 202

In order to be able to obtain a proper decision whether to admit or refuse the request for the application to access the WLAN 101, the network node 103, 104, 111 obtains traffic pattern information relating to the application, which traffic pattern information is derived from a deep packet inspection functionality of the cellular communications network 100. Traffic pattern information derived from a deep packet inspection functionality, provides a more accurate information about characteristics of the application than what is the case in prior art solutions, and may be used when obtaining a decision, as described below in action 205.

In some embodiments, the obtaining traffic pattern information relating to the application comprises receiving a report from a support node 106 of the cellular communications network 100, which report relates to the traffic pattern information. Exemplary embodiments of the obtaining of the traffic pattern information is described in more detail below.

Action 203

In some embodiments, the network node 103, 104, 111 further obtains an estimation of an available data rate relating to the access point 110 to be used for the access to the WLAN according the request, which access point 110 is comprised in the WLAN 101.

In that way more information is provided which may be used as a basis for the decision described below in action 205, and a more accurate decision may be made.

Action 204

In some embodiments, the network node 103, 104, 111 further obtains a measure of a channel utilization relating to the access point 110 to be used for the access to the WLAN according the request, which access point 110 is comprised in the WLAN 101.

In that way more information is provided which may be used as a basis for the decision described below in action 205, and a more accurate decision may be made.

Action 205

The network node 103, 104, 111 obtains a decision whether to admit or refuse the request for the application to access the WLAN 101, which decision is based on the obtained traffic pattern information. Thereby, the decision whether to admit or refuse the request for an application to access the WLAN is based on more accurate information than in existing solutions. Thereby, an improved capacity usage and performance of the cellular communications network and of the WLAN, co-deployed with the cellular communications network, may be achieved.

In some embodiments, in which the network node 103, 104, 111 has obtained an estimation of an available data rate relating to an access point 110 to be used for the access to the WLAN, as described in relation to action 203 above, the decision is further based on the obtained estimation of the available data rate. In that way, a more accurate decision may be made.

In some embodiments, in which the network node 103, 104, 111 has obtained a measure of a channel utilization relating to an access point 110 to be used for the access to the WLAN, as described in relation to action 204 above, the decision is further based on the obtained measure of the channel utilization. In that way, a more accurate decision may be made.

The decision may be made by the network node 103, 104, 111 itself, or, in some embodiments, wherein the network node 103, 104, 111 is embodied as an access point control node 103, 111, it may receive the decision from the control node control node 103, 104.

Thus, in some embodiments, the network node 103, 104, 111 decides whether to admit or refuse the request for the application to access the WLAN 101, based on the obtained traffic pattern information.

In some other embodiments, the network node 103, 104, 111 receives the decision from a control node 103, 104 comprised in the cellular communications network 100, which decision relates to whether to admit or refuse the request for the application to access the WLAN 101, and which decision is based on the obtained traffic pattern information.

Action 206

The network node 103, 104, 111 may then transfer the application from communicating in the cellular network 100 to communicate in the WLAN 101, when the decision is to admit the request for the application to access the WLAN 101.

Exemplary embodiments of a method in a network node 103, 104, 111 for deciding whether to admit or refuse a request for an application to access a WLAN, will now be described with reference to the combined flow chart and signaling diagram depicted in FIG. 3. In the embodiments depicted in FIG. 3, the network node 103, 104, 111 is embodied as an access point control node 103, 111. The method comprises the following actions, which actions may be taken in any suitable order. Dashed lines of some boxes in FIG. 3 indicate that the corresponding actions are not mandatory. These exemplary embodiments correspond to the embodiments described above in relation to FIG. 2, and comprises the actions described above in relation to FIG. 2. Only actions 301 and 302 will be further described here.

Action 301.

Figure 3:
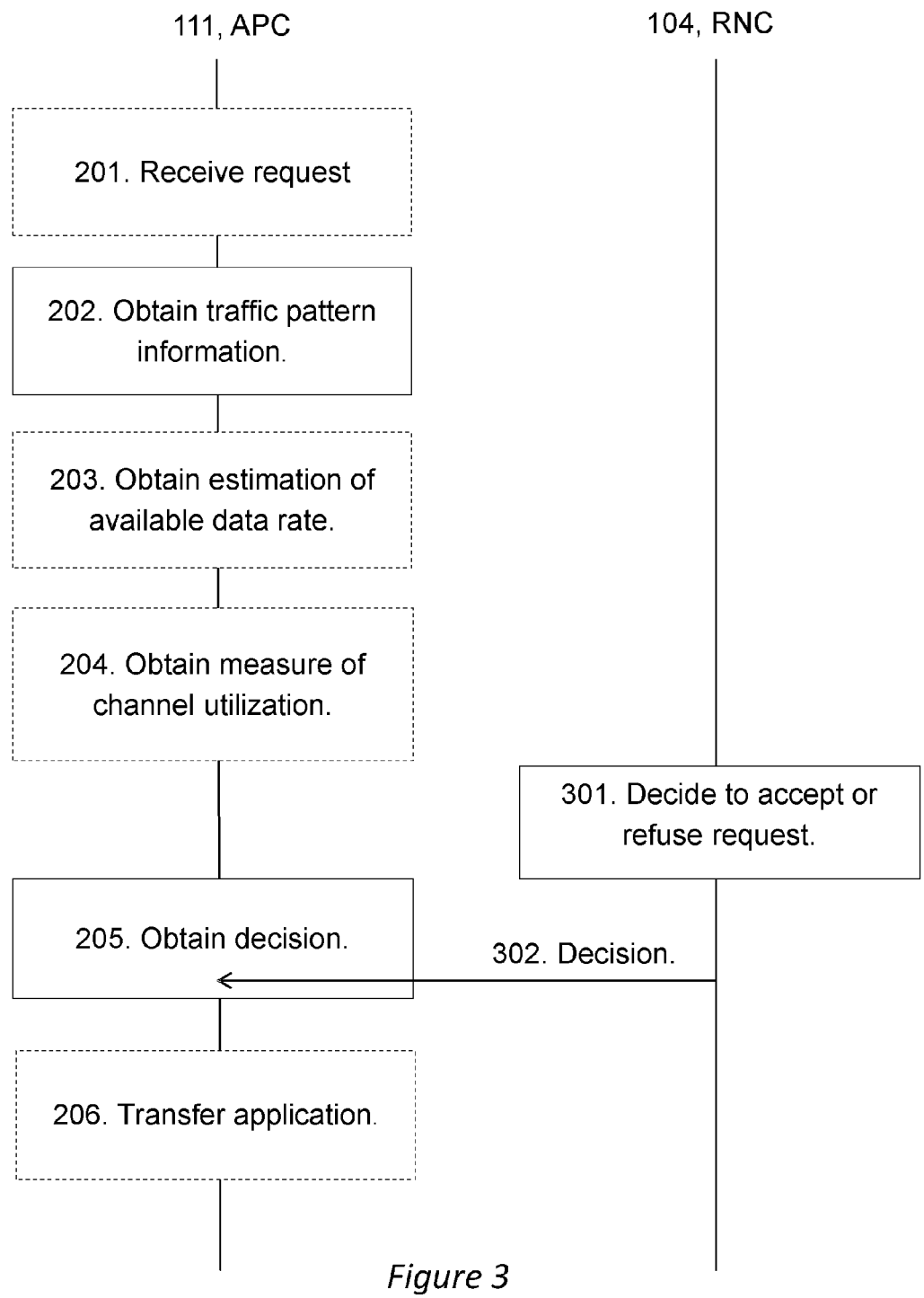
FIG. 3 is a combined signalling diagram and flowchart illustrating embodiments of a method in a network node.

In the embodiments illustrated in FIG. 3 the control node 103, 104 decides whether to admit or refuse the request for the application to access the WLAN 101, and informs the network node 103, 104, 111 accordingly.

Action 302.

The network node 103, 104, 111 thus receives the decision from a control node 103, 104 comprised in the cellular communications network 100, which decision relates to whether to admit or refuse the request for the application to access the WLAN 101, and which decision is based on the obtained traffic pattern information.

Exemplary embodiments of methods described in a general way above will now be described in more detail, sometimes in relation to the signaling diagram depicted in FIG. 4. The description below may refer to any embodiment above.

The available throughput for an access point 110 of a WLAN is subject to the free channel capacity relating to the access point 110. Free channel capacity is calculated from the current channel occupation time, that is, the total time existing users and the access point allocate the channel to transmit data. Channel occupation time, however, highly depends on the traffic characteristics and the modulation scheme applied for each and every user and/or application. The more robust the modulation scheme is, the less throughput it is able to provide, and therefore, the more channel time it requires to transmit the same amount of data. Therefore, it is an advantage to be aware of the transmission capabilities, such as the radio conditions, and the traffic pattern of the new application or applications that is about to join the WLAN.

The decision mechanism may therefore require the following inputs:
Free channel capacity,
Set of physically available bitrates Traffic pattern of the application.

Action 401.

The free channel capacity may be measured by the help of channel occupancy. The access point control node 103, 111 may periodically poll the relevant access point 110 to get information about current channel utilization and free channel capacity or free channel time, as illustrated in FIG. 4.

Action 402.

The access point may then send an update of the free channel time. The information may then be aggregated and averaged over time and stored in the access point control node 103, 111.

Action 403.

In this way, the access point control node 103, 111 may calculate the free channel time relating to the access point 110. In other words, the access point control node 103, 111 obtains a measure of a channel utilization relating to the access point 110. Actions 401, 402 and 403 thus relate to action 204 described above. The access point control node 103, 111 may further be configured to allow some free capacity left for the access points 110, which is not to be included in the free capacity calculation.

In some embodiments, the control node 103, 104, obtains a measure of a channel utilization relating to the access point 110, by means of receiving information relating to the above calculation from the access point control node 103, 111.

For each data flow defined by an application run by a wireless device 114 in the cellular communications network 100, a Packet Data Protocol (PDP) Context may be maintained in the support node 106. In the PDP Context a transport service quality is described by the QoS Profile.

The QoS Profile as defined by the Third Generation Partnership Project (3GPP), may have the following attributes interesting for the CAC decision mechanism:

A maximum bitrate (Uplink/Downlink)

A guaranteed bitrate (available if the service is a guaranteed service)

Furthermore, the QoS Profile comprises the attributes "transfer delay" and "maximum SDU size".

The text below relates to action 202 above.

In order to provide more detailed information for the decision mechanism or CAC procedure, the standard attributes may according to embodiments herein be extended by at least the following set of new QoS parameters, for all services, or at least for users allowed to perform handovers to the WLAN 101:

An average packet size (Uplink/Downlink)

A mean bitrate (Uplink/Downlink)

These QoS attributes are derived from the DPI functionality deployed within or near to the support node 106. The DPI functionality may be provided in a DPI node 108, connected to the support node 106, or within the support node 106.

DPI functionality may be provided by hardware and software to monitor a network's data flow. DPI functionality may be used to identify protocols and applications, intrusion attempts and malware by looking deep into data packets. DPI functionality may provide security and translation functions by inspecting incoming packets, reassembling and decompressing them, analyzing the code and passing data to appropriate applications and services. DPI functionality may also be used by service providers to offer subscribers different levels of access, such as type of usage, data limits or bandwidth level, comply with regulations, prioritize traffic, adjust loads and gather statistical information. DPI may recognize applications as data passes through the system, and allocate to each the resources they need. The DPI functionality may use a variety of techniques, including signature and heuristics based detection, to identify the nature of a packet's payload.

The support node 106 may provide periodical refreshes of the QoS attributes or may provide the requested attributes whenever a request is received from the control node 103, 104, due to a new user or application to join the WLAN 101.

Action 404.

According to some embodiments, the access point sends a request for a new user or application to join the WLAN 101, to the access point control node 103, 111.

Action 405.

The access point control node 103, 111 may then send a request to the control node 103, 104.

Action 406.

The control node 103, 104 may then request the QoS Profile and the supplementary QoS attributes from the support node 106 referred to by a Temporary Logical Link Identity (TLLI) identifier. In this way, the control node 103, 104 obtains traffic pattern information relating to the application, which traffic pattern information is derived from a deep packet inspection functionality of the cellular communications network 100.

The implementation depends on where the specified parameter extensions are stored. Thanks to the DPI functionality, the system may track traffic pattern changes of a given user's application.

The control node 103, 104 may then request the QoS Profile and the supplementary QoS attributes from the support node 106 referred to by a Temporary Logical Link Identity (TLLI) identifier.

Action 407.

The support node 106 may provide the information derived from DPI functionality by means of requesting attributes relating to information derived from DPI functionality from a DPI node 108, or by means of a functionality integrated in the support node itself.

Action 408.

If the support node requests attributes from the DPI node 108, the DPI node may send the requested attributes to the support node 106.

Action 409.

The support node 106 may then send a reply relating to the QoS Profile and the supplementary QoS attributes to the control node 103, 104. In this way, the control node 103, 104 may obtain traffic pattern information relating to the application, which traffic pattern information is derived from a deep packet inspection functionality of the cellular communications network 100. Actions 406, 407, 408 and 409 thus relates to action 202 above.

Alternatively, the support node 106 may provide a traffic category instead of the QoS attributes, whenever the control node 103, 104 requests so. The categorization may then be based on inputs from the DPI functionality, based on the observed traffic patterns, and the traffic type indicated originally in the QoS Profile. Then, the control node also obtains 202 traffic pattern information relating to the application, which traffic pattern information is derived from a deep packet inspection functionality of the cellular communications network 100.

The categorization may reflect the characteristics of the traffic flow related to the application with focus on parameters that the QoS Profile and the supplementary QoS attributes would comprise.

The support node 106 may provide the information derived from DPI functionality by means of requesting it from a separate node 108, or by means of a functionality integrated in the support node itself.

A wireless device 114 may have several data-flow associations with the cellular communications network 100 depending on the number of applications being used concurrently. Each data flow is described by a PDP Context, and each PDP Context has a specific QoS Profile. However, within the same QoS Profile/Context or within the same bearer, the end-user is allowed to run several applications. In this case such a QoS Profile is not sufficient enough to describe a single data flow alone. If the CAC decision is selective, that is, based on system configuration, only given type of user data flows and/or applications, such as, for example high quality variable bit rate (VBR) streaming, may be pushed to the WLAN, a per data flow based tracking may be implemented. A QoS attribute list may in this case be extended by a flow ID and the information may be used to keep track on the traffic characteristics by the DPI functionality, on a per user and per data flow and/or per application basis.

Based on the inputs mentioned above, such as, free channel capacity, set of physically available bitrates, and traffic pattern of the application, the control node 103, 104 or the access point control node 103, 111 performs the decision process as described above in relation to action 205.

During the process, a two-step-check procedure may be performed. In the first step a set of data rates are determined which theoretically could allow the wireless device's application fit into the free channel capacity. In the second step, a most stable data rate that the application is likely to use in the current radio conditions is specified.

The wireless devices data flow or traffic needs to fit in to the free capacity the access point is capable of.

Action 410.

Information relating to the traffic characteristics may be sent from the control node 103, 104 to the access point control node 103, 111 when the control node 103, 104 has received a reply relating to the QoS Profile and the supplementary QoS attributes from the support node 106.

Action 411.

The access point control node 103, 111 may execute a pre-calculation relating to which data rates would allow this, by taking into consideration the free channel capacity the given access point has and the traffic characteristic of the application, which is obtained from the support node 106 by means of DPI functionality.

The process may result in a set of data rates, wherein each of the data rate theoretically allows the traffic of the joining application to fit in to the free channel time. If the pre-calculation results in an empty set of supporting data rates, the access point control node 103, 111 may block the request for an application to access the WLAN, and it may also indicate this to the control node 103, 104. If the pre-calculation results in a set of supporting data rates which is not empty the decision process may be arranged to continue.

During a WLAN association procedure the access point may advertise as supported rates to the wireless device 114 the set of data rates determined by the previous step during the pre-calculation process.

During the WLAN authentication/association process the access point 110 may use a step-down algorithm for data rates at which the corresponding management frames are sent. The step-down algorithm may first try with the highest data rate the pre-calculation algorithm provided, or the highest supported by the control node 103, 111. If the response message is not acknowledged, then it will continue trying with the same data rate for a given number of times configured or until the request message is re-sent from the wireless device 114. This will indicate that the data rate is not available for the wireless device. If, after a number of trials the message is acknowledged, the access point 110 or access point control node 103, 111 may indicate this data rate as instable. The access point 110 may continue the procedure with the next available slower data rate until it reaches a rate that is considered to be stable or there are no more data rates available from the set derived during the pre-calculation phase.

If none of the rates are considered to be stable, the access point control node 103, 111 may block the request and indicate this to the control node in the cellular communications network.

If the decision mechanism is implemented in the control node 103, 104, the access point control node 103, 111 may provide the control node 103, 104 with information relating to if the existing QoE can be kept for a given application or not.

The set of physically available bitrates for the joining application may be different from the supported data rates sent and negotiated between the wireless device 114 and the access point 110. The physically available data rates may be traced over time as well, when the application has been accepted by the access point control node 103, 111. This may be used to push the user back to the cellular communications network 100 if a QoS degradation is observed.

Action 412.

Figure 4:
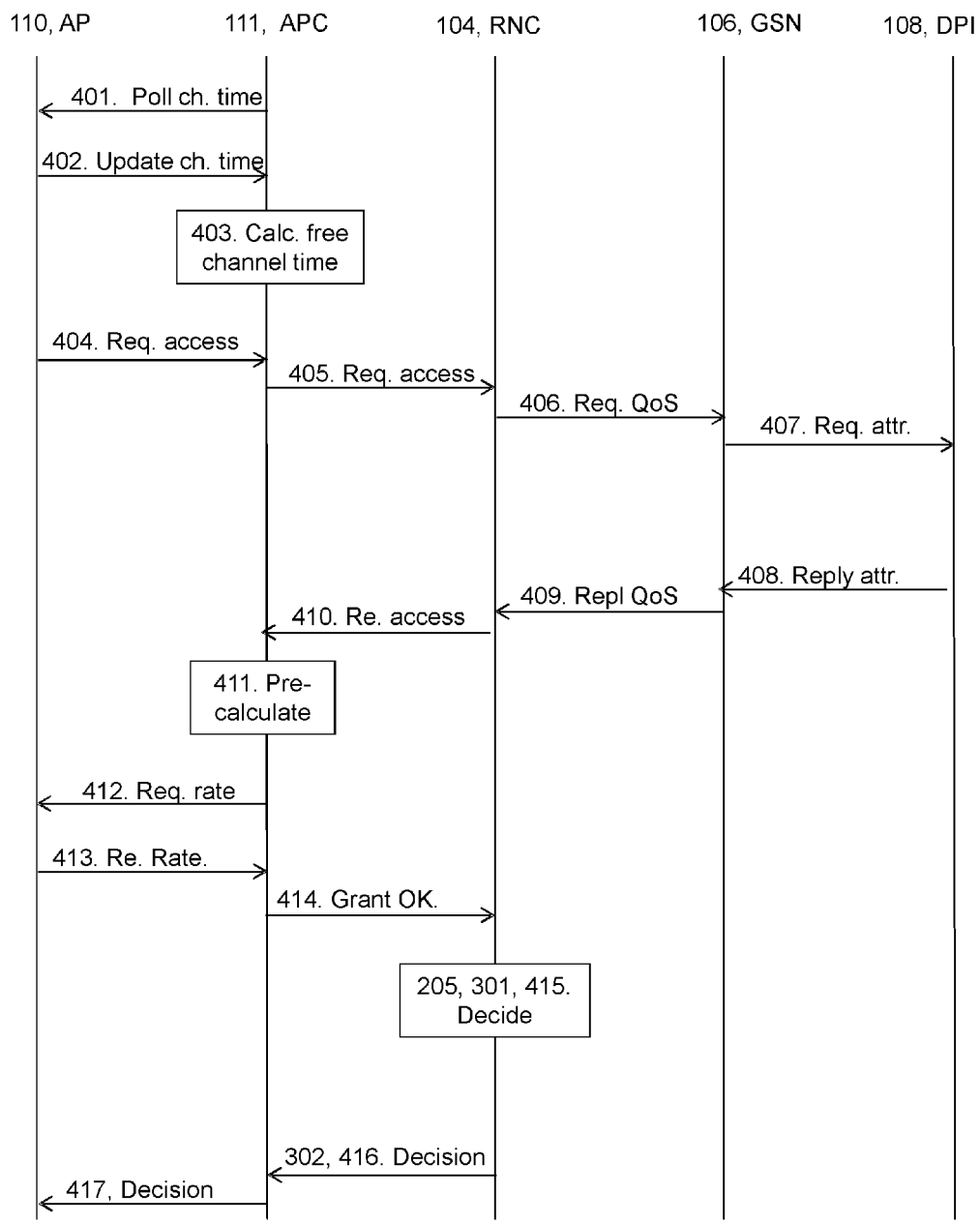
FIG. 4 is a signalling diagram illustrating various embodiments herein.

As illustrated in FIG. 4, the access point control node 103, 111 may obtain 203 an estimation of an available data rate relating to an access point 110 by means of requesting data rate information from the access point control node 103, 111.

Action 413.

The access point control node 103, 111 may then receive the requested data rate information from the access point 110.

The access point control node 103, 111 may thus obtain the estimation described above in action 203 by means of requesting, receiving and processing data rate information from the access point 110. Actions 412, and 413 thus relate to action 203 described above Action 414.

The access point control node 103, 111 may then send information to the control node 103, 104 telling if an application(s) can get a bandwidth as indicated in the QoS attributes.

Action 415.

The control node 103, 104 may then decide whether the request for the application to enter the WLAN should be accepted or not.

Action 416.

The control node 103, 104 may then send the decision to the access point control node 103, 111. In FIG. 3, reference numeral 301 indicates the decision and reference numeral 302 indicates sending and receiving of the decision. The decision also relates to action 205 described above.

Action 417.

The access point control node may send information relating to the decision to the access point 110.

If there is at least one data rate found as stable the access point control node 103, 111 may compute whether, based on current radio conditions, the traffic may still be let in. Depending on QoE awareness level, the process may decline the admission of the application if none of the stable data rates are sufficient for the traffic, or if only one of the many data rates are found to be sufficient for the traffic. Otherwise the traffic may be let in to the WLAN. The access point control node notifies the cellular communications network about this.

As mentioned above, the support node 106 may report a traffic category instead of the QoS attributes, whenever the control node 103, 104 requests so. The categorization may then be based on inputs from the DPI functionality, based on the observed traffic patterns, and the traffic type indicated originally in the QoS Profile. The categorization may reflect the characteristics of the traffic flow with focus on the parameters that the QoS Profile and the supplementary QoS attributes would comprise.

Figure 5:
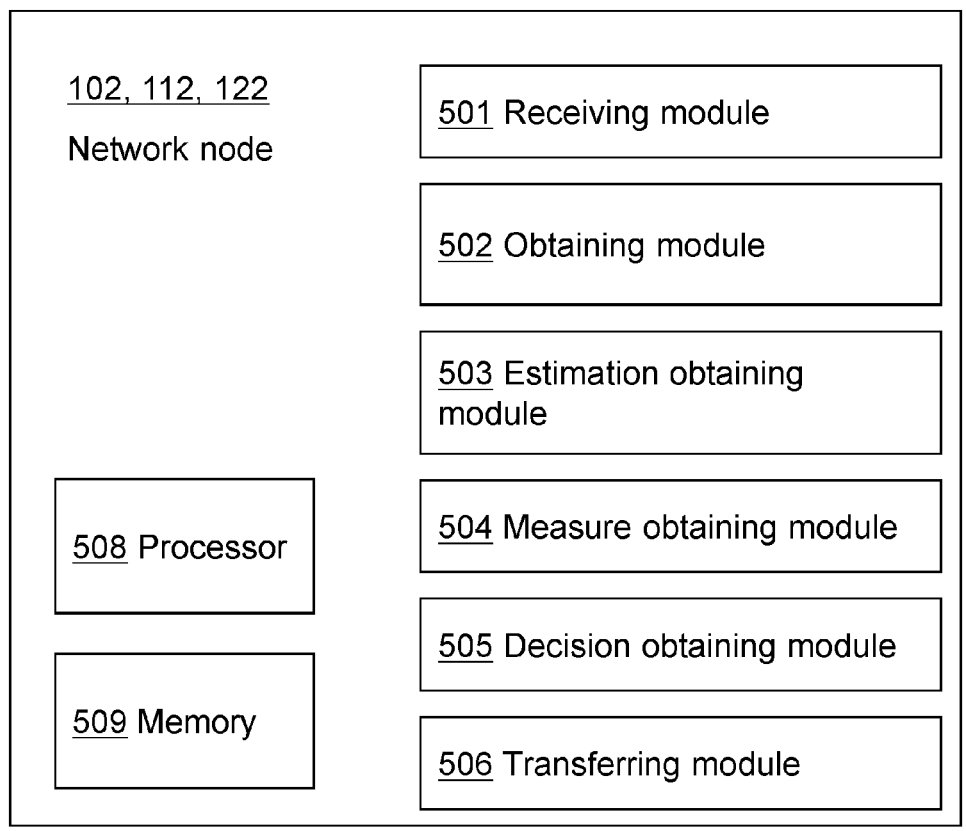
FIG. 5 is a schematic block diagram illustrating embodiments of a network node.

The network node 103, 104, 111 for handling a request for an application to access a Wireless Local Area Network, WLAN 101, as described above in relation to FIG. 2, is depicted in FIG. 5.

As mentioned above, the network node 103, 104, 111 may be configured to receive a request from the WLAN for an application to access the WLAN. In some embodiments, the network node 103, 104, 111 comprises a receiving module 501, configured to receive the request.

The network node 103, 104, 111 is configured to obtain traffic pattern information relating to the application, which traffic pattern information is derived from a deep packet inspection functionality of the cellular communications network 100. In some embodiments the network node 103, 104, 111 comprises an obtaining module 502, configured to obtain traffic pattern information relating to the application, which traffic pattern information is derived from a deep packet inspection functionality of the cellular communications network 100.

In some embodiments, the network node 103, 104, 111 is configured to receive a report from a support node 106 which report relates to the traffic pattern information. In some of these embodiments, the network node 103, 104, 111 comprises the receiving module 501, configured to receive the request.

In some embodiments, the network node 103, 104, 111 is further configured to obtain an estimation of an available data rate relating to an access point 110 to be used for the access to the WLAN according the request, which access point 110 is comprised in the WLAN 101. In some of these embodiments, the network node 103, 104, 111 comprises an estimation obtaining module 503, configured to obtain the estimation of an available data rate relating to an access point 110 comprised in the WLAN 101.

In some embodiments, the network node 103, 104, 111 is further configured to obtain a measure of a channel utilization relating to an access point 110 to be used for the access to the WLAN according the request, which access point 110 is comprised in the WLAN 101. In some of these embodiments, the network node 103, 104, 111 comprises a measure obtaining module 504, configured to obtain the measure of the channel utilization relating to the access point 110 comprised in the WLAN 101.

The network node 103, 104, 111 is further configured to obtain a decision whether to admit or refuse the request for the application to access the WLAN 101, which decision is based on the obtained traffic pattern information.

In some embodiments, the network node 103, 104, 111 comprises a decision obtaining module 505, configured to obtain a decision whether to admit or refuse the request for the application to access the WLAN 101, based on the obtained traffic pattern information. In some embodiments, in which the network node 103, 104, 111 is further configured to obtain an estimation of an available data rate relating to an access point 110 comprised in the WLAN 101, the decision is further based on the obtained estimation of the available data rate.

In some embodiments, in which the network node 103, 104, 111 is configured to obtain a measure of a channel utilization relating to an access point 110 comprised in the WLAN 101, the decision is further based on the obtained measure of the channel utilization.

In some embodiments, the network node 103, 104, 111 is configured to decide whether to admit or refuse the request for the application to access the WLAN 101, based on the obtained traffic pattern information.

In some other embodiments, the network node 103, 104, 111 is configured to receive a decision from a control node 103, 104 comprised in the cellular communications network 100, which decision relates to whether to admit or refuse the request for the application to access the WLAN 101, and which decision is based on the obtained traffic pattern information. In some of these embodiments, the network node 103, 104, 111 comprises a receiving module 501, configured to receive the decision.

In some embodiments, the network node 103, 104, 111 is further configured to transfer the application from communicating in the cellular network 100 to communicate in the WLAN 101, when the decision is to admit the request for the application to access the WLAN 101. In some of these embodiments, the control node 103, 104 comprises a transferring module 506, configured to obtain the transfer of the application to the WLAN 101, based on the decision.

The embodiments herein for handling a request for an application to access a WLAN 101, may be implemented through one or more processors, such as a processor 508 in the network node 103, 104, 111 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the network node 103, 104, 111. One such carrier may be in the form of a CD ROM disc. It is however feasible with other data carriers such as a memory stick. The computer program code may furthermore be provided as pure program code on a server and downloaded to the network node 103, 104, 111.

The network node 103, 104, 111 may further comprise a memory 509 comprising one or more memory units. The memory 509 is arranged to be used to store indications, metrics, determined measures of the downlink interference, cell parameters, configurations, and applications to perform the methods herein when being executed in the network node 103, 104, 111.

Those skilled in the art will also appreciate that the receiving module 501, obtaining module 502, estimation obtaining module 503, measure obtaining module 504, decision obtaining module 505 and transferring module 506 described above may refer to a combination of analog and digital circuits, and/or one or more processors configured with software and/or firmware, e.g. stored in a memory, that when executed by the one or more processors such as the processor 508 as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for handling a request for an application to access a Wireless Local Area Network (WLAN), wherein the application is run by a wireless device and the application communicates in a cellular communications network, the method comprising:
    receiving the request for the application to access the WLAN, wherein the request was transmitted by an access point of the WLAN to the network node;
    after receiving the request for the application to access the WLAN, obtaining traffic pattern information relating to the application, wherein the traffic pattern information is derived from a deep packet inspection functionality of the cellular communications network; and
    determining whether to admit or refuse the request for the application to access the WLAN, wherein the determination is based on the obtained traffic pattern information and the determination further comprises executing a pre-calculation that results in a set of data rates, wherein each of the data rate allows traffic of the application to fit into a free channel time of the WLAN.

2. The method of claim 1, furthermore comprising obtaining an estimation of an available data rate relating to an access point to be used for the access to the WLAN according the request, which access point is comprised in the WLAN, and wherein
    the determination is further based on the obtained estimation of the available data rate.

3. The method of claim 1, furthermore comprising:
    obtaining a measure of a channel utilization relating to an access point to be used for the access to the WLAN according the request, which access point is comprised in the WLAN, and wherein
    the determination is further based on the obtained measure of the channel utilization.

4. The method of claim 1, furthermore comprising transferring the application from communicating in the cellular communications network to communicate in the WLAN as a result of deciding to admit the request for the application to access the WLAN.

5. The method of claim 1, wherein the obtaining traffic pattern information relating to the application comprises receiving a report from a support node of the cellular communications network, which report relates to the traffic pattern information.

6. The method of claim 1, wherein
    the determining is performed by deciding whether to admit or refuse the request for the application to access the WLAN, based on the obtained traffic pattern information.

7. The method of claim 1, wherein the network node is an access point control node comprised in the WLAN or a control node comprised in the cellular communications network.

8. The method of claim 7, wherein the network node is the access point control node comprised in the WLAN, and wherein the determining comprises receiving the determination from the control node comprised in the cellular communications network.

9. The method of claim 1, wherein the traffic pattern information comprises a Quality of Service (QoS) profile comprising a plurality of attributes.

10. The method of claim 9, wherein the plurality of attributes comprises an average packet size and a mean bitrate.

11. The method of claim 1, further comprising:
    refusing the request for the application to access the WLAN when the set of data rates is an empty set.

12. The method of claim 1, further comprising:
    selecting a highest data rate from the set of data rates when the set of data rates comprises one or more data rates; and,
    determining whether the selected highest data rate is available for the wireless device.

13. A network node for handling a request for an application to access a Wireless Local Area Network (WLAN), wherein the application is run by a wireless device and the application communicates in a cellular communications network, wherein the network node is configured to:
    receive the request for the application to access the WLAN, wherein the request was transmitted by an access point of the WLAN to the network node;
    after receiving the request for the application to access the WLAN, obtain traffic pattern information relating to the application, which traffic pattern information is derived from a deep packet inspection functionality of the cellular communications network, and
    determine whether to admit or refuse the request for the application to access the WLAN, wherein the determination is based on the obtained traffic pattern information and the determination further comprises executing a pre-calculation that results in a set of data rates, wherein each of the data rate allows traffic of the application to fit into a free channel time of the WLAN.

14. The network node of claim 13, further being configured to
    obtain an estimation of an available data rate relating to an access point to be used for the access to the WLAN according the request, which access point is comprised in the WLAN, and wherein
    the determination is further based on the obtained estimation of the available data rate.

15. The network node of claim 13, further being configured to
    obtain a measure of a channel utilization relating to an access point to be used for the access to the WLAN according the request, which access point is comprised in the WLAN, and wherein
    the determination is further based on the obtained measure of the channel utilization.

16. The network node of claim 13, further being configured to
    transfer the application from communicating in the cellular communications network to communicate in the WLAN, when the determination is to admit the request for the application to access the WLAN.

17. The network node of claim 13, further being configured to
    receive a report from a support node of the cellular communications network, which report relates to the traffic pattern information.

18. The network node of claim 13, wherein the network node is further configured to decide whether to admit or refuse the request for the application to access the WLAN, based on the obtained traffic pattern information.

19. The network node of claim 13, wherein the network node is an access point control node comprised in the WLAN or a control node comprised in the cellular communications network.

20. The network node according to claim 19, wherein the network node is the access point control node comprised in the WLAN, and wherein the network node is further configured to
  receive the determination from the control node comprised in the cellular communications network, which determination relates to whether to admit or refuse the request for the application to access the WLAN, and which determination is based on the obtained traffic pattern information.

\* \* \* \* \*